United States Patent [19]

Switzer, Jr.

[11] 3,986,348

[45] Oct. 19, 1976

[54] COAL-FUELED COMBINED CYCLE POWER GENERATING SYSTEM

[76] Inventor: George W. Switzer, Jr., 13840 Salisbury Road, Midlothian, Va. 23113

[22] Filed: Dec. 18, 1974

[21] Appl. No.: 533,826

Related U.S. Application Data

[63] Continuation of Ser. No. 354,163, April 25, 1973, abandoned.

[52] U.S. Cl. .............................. 60/39.02; 60/39.12; 60/39.18 B
[51] Int. Cl.² .................. F02C 3/22; F02C 7/02
[58] Field of Search ............ 48/203, 216; 60/39.46, 60/39.18 B, 39.02, 39.12; 23/288 S; 122/40; 110/28 J

[56] References Cited
UNITED STATES PATENTS

| | | |
|---|---|---|
| 2,631,934 | 3/1953 | Lewis.................................. 48/203 |
| 2,633,416 | 3/1953 | Gornowski et al................... 48/203 |
| 3,659,559 | 5/1972 | Foldes et al. ...................... 122/4 D |

Primary Examiner—Carlton R. Croyle
Assistant Examiner—L. J. Casaregola
Attorney, Agent, or Firm—William J. Ruano

[57] ABSTRACT

Apparatus and method for producing "clean" fuel from coal for general use such as, for example, in combined cycle power generating plants. Bituminous coal is only partially gasified in a carbonizer and gasifier furnace of a boiler to produce and refine the fuel necessary for the combustion turbine portion of the cycle. The remaining ungasified portion of the coal is fed into the furnace of a boiler and burned as solid fuel with combustion turbine exhaust gases. The gas produced for use in the combustion turbine will contain virtually all pyritic sulfur of the coal and this will be removed from the gas before introduction into the combustion turbine. The gas and carbonized coal may be used for other applications than combined cycle power generating plants.

4 Claims, 1 Drawing Figure

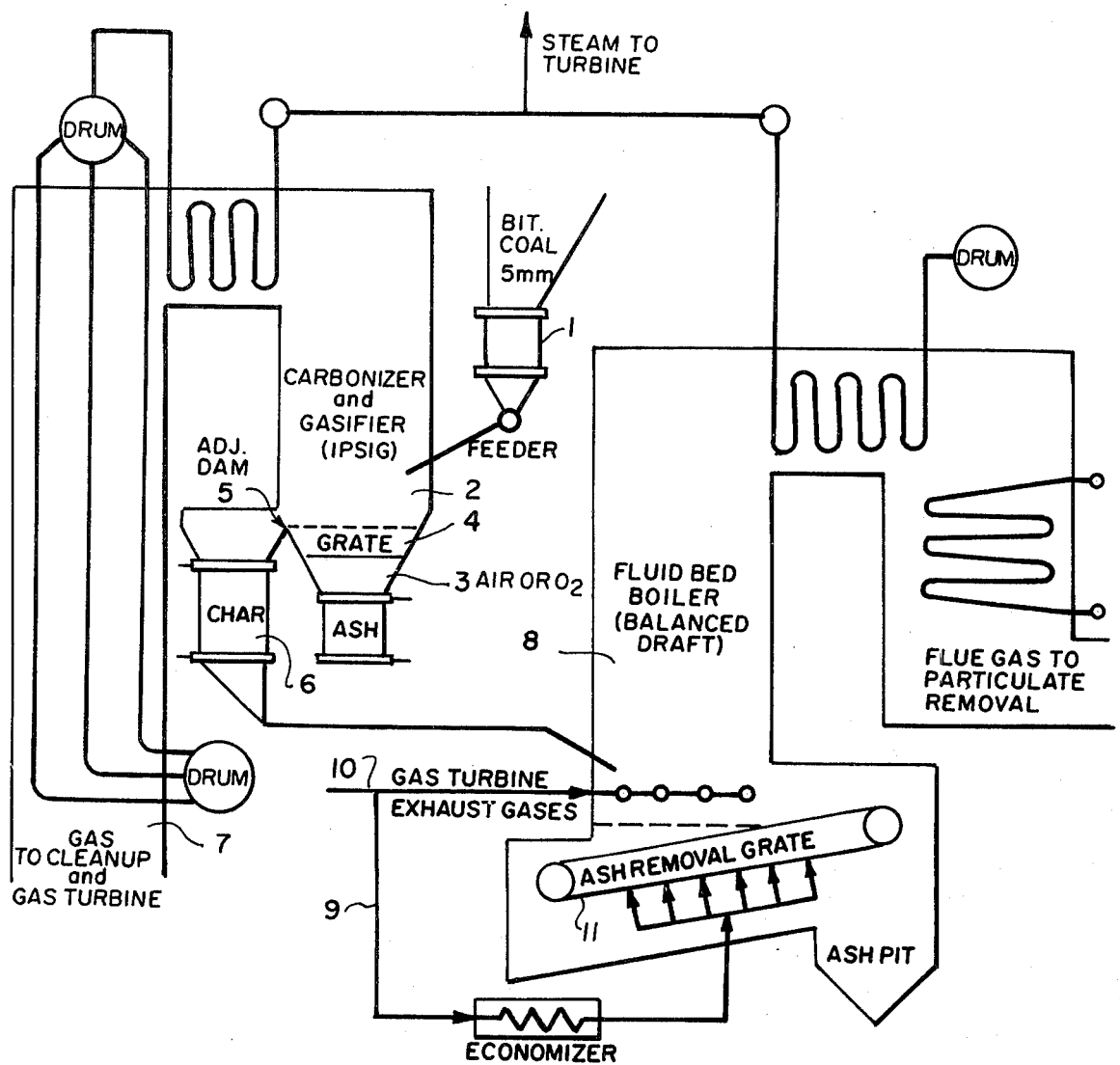

COAL-FUELED COMBINED CYCLE POWER GENERATING SYSTEM

This application is a continuation of Ser. No. 354,163, filed Apr. 25, 1973, now abandoned.

This invention relates to a coal-fueled, combined cycle, power generating method and apparatus.

One of the most efficient means of generating electricity from fossil fuels is the combined cycle type plant. In this type plant, fluid fuel is burned directly in a combustion turbine which drives a generator, and the relatively hot exhaust gas from the combustion turbine is used, with or without supplementary fuel combustion, to generate steam. The steam is then used to drive a turbine and generate electricity in a more or less conventional steam cycle arrangement. An improvement in thermal efficiency results over that obtained if the fuel were burned either in the same combustion turbine or the same steam cycle alone.

A limitation of fuel choice is inherent in the use of combustion turbines. They require "clean" fuels, either gaseous or liquid. That is, the fuels must be practically free of ash, sulfur, and certain metallic elements for successful application. Such fuels are increasingly in short supply, hence expensive, and of doubtful availability. In addition, further improvements anticipated in cycle efficiencies involving combustion turbines are in the direction of increased temperature of combustion gases entering turbine blades and these conditions will impose even more stringent requirements of fuel quality. In contrast to the increasing shortages of suitable natural gas and refined fuel oils, a plentiful supply of coal fuel exists in the United States. This fuel in its raw or easily prepared form, has none of the attributes of clean fuel particularly the degree of clean required by combustion turbines. There are many efforts being expended to develop, from coal, fuels both liquid and gaseous, sufficiently clean to burn in combustion turbines or in other combustion equipment without undue detriment to the air quality. Some of the development efforts are directed at converting coal to high quality gas equivalent to natural gas and suitable for long distance transmission in pipelines. Other efforts are directed at liquid fuels and still others to low quality gas suitable for use as fuel near the location of the conversion plant. All of the efforts anticipate removal of the undesirable ash and chemical elements during conversion so that a clean fuel results.

An outstanding disadvantage of the processes and equipment required for presently known methods is that they are in various degrees complicated and will require development, bench scale and pilot plant testing, and finally construction of prototype size plants. The capital and operating costs are likely to be high.

For the limited purpose of producing fuel from coal for use in combined cycle power generating plants, commercial equipment is available which would require the minimum of development time and funds.

An object of the present invention is to provide a novel process which will overcome the abovenamed disadvantages and which would only partially gasify the coal to produce and refine the fuel necessary for the combustion turbine portion of the cycle. The remaining ungasified portion of the coal would be burned as solid fuel with combustion turbine exhaust gases.

The gas produced for use in the combustion turbine will contain virtually all of the pyritic sulfur of the coal and this will be removed by well-known means (with the sulfur converted into either a useful or a disposable form). At the same time any particulate matter will be removed from the gas ahead of its introduction into the combustion turbine.

The process of carbonizing the coal (distillation of the volatile constituents) and gasification of a portion of the carbon according to the present invention will permit the recovery without degradation of the high heat values of gaseous constituent of the coal. The process would not require an ancillary oxygen plant as do most processes when the coal is to be completely gasified and the process can be conducted at near-atmospheric pressure, wherein auxiliary equipment components are already developed and commercially available.

The ungasified portion of the coal or "char" will be of low volatile content and will contain virtually all of the original ash content of the coal. This char will be burned in special, but commercially available, types of boilers. These types of boilers have proved their ability to burn fuel of low volatile and high ash contents by successfully burning fuel recovered from anthracite waste dumps with these same fuel characteristics.

Particulate removal by conventional means will be necessary on the flue gases leaving the fluid bed boiler. The means for this function are well known and used on power generation boilers.

Many experiments have been conducted successfully gasifying coal in fluid bed vessels. However, the device required for the system proposed herein is simpler in its function in that the coal is only partially gasified and the char retains practically all of the ash.

Other objects and advantages of the invention will become more apparent from the study of the following description taken with the accompanying drawing wherein the single FIGURE of the drawing shows the gasifying portion of a coal fired, combined cycle, power generating system, shown schematically, embodying the present invention.

Referring more particularly to the drawing, the operation of the system is as follows:

Bituminous coal of medium or high volatile content, crushed to approximately 5 millimeter X zero size is placed in a hopper 1 on one side of the gas producer (carbonizer-gasifier) 2. Since the gas producer will operate at positive pressure, the coal is fed into the producer through a double valved hopper. Air 3 is fed underneath a grate 4 and accomplishes fluidization or lifting of the bed of coal above the grate 4. On the opposite side of the producer from the coal admission, a dam 5 having an adjustable height, determines the height to which the fluidized bed will rise. Once ignited, the air 3 will react with the coal in partial combustion. Heat from this partial combustion will volatilize the gases from the incoming coal.

The gaseous product from the partial combustion and the volatile gases driven out of the coal will rise from the bed and leave the producer going next into heat recovery apparatus 7. The devolatilized coal or char particles, being hydraulically lighter than the original particles of coal, will be carried to the top of the fluidized bed by the upflow of gases in the bed. As more coal is continuously fed, the level of char on the bed will exceed the height of the dam and the char will "float" or decant into the char hopper 6. The hot char will then be conveyed or fall by gravity into the furnace of boiler 8. An example is shown of a fluid bed boiler, but other types of boilers may be used.

The fluid bed boiler 8 will complete combustion of the char and remove the ashes by conventional means. Combustion air for the boiler will be exhaust gases 9 from the gas turbine, which exhaust gases contain an excess of oxygen over that needed for complete combustion of the char. The boiler 8, similar to the gas producer 2, accomplishes partial combustion of the carbon in the char in the fluid bed. Hence, only a portion of the gas turbine exhaust gases will be fed below the grate 11 to accomplish fluidization and partial combustion. Due to mechanical limitations of the ash removal grate 11, this fluidizing gas must be cooled below its temperature coming from the gas turbine exhaust. Heat removed in cooling the gas will be passed into the feedwater flowing into the boiler.

The remainder of the gas turbine exhaust gas 10,— that not being used for fluidizing and partial combustion, will be introduced into the boiler furnace above the fluid bed to complete combustion of the gaseous products emitting from the fluid bed.

Depending on the volatile content of the raw coal and hence the gas produced in the gas producer 2, it may be desirable to supplement the char fed to the boiler 9 with raw 5 millimeter X zero coal. In other cases or at other times it may be desirable to burn in the boiler some of the gas produced in the gas producer. These variations would occur if the volatile content of the raw coal varied beyond the range for which the gas turbine and boiler were designed.

For a given coal analysis, the gas leaving the gas producer 2 will have a definite heat value variable somewhat by the amount of air introduced into the producer. For the same coal, a higher heat value gas will be produced if oxygen instead of air 3 is introduced into the gas producer 2. Again the basic heat value will be variable somewhat by the amount of oxygen introduced into the producer. The quantity of exhaust gases from the gas turbine, will however, tend to be independent of the unit heating value of the fuel consumed since the total weight of products of combustion must be controlled to achieve a constant gas temperature entering the gas turbine blades.

The gases leaving the gas producer 2 will be at an elevated temperature. This gas must be cleaned at 7 of sulfur products, particulates and tars and compressed for introduction into the gas turbine. All of these operations can be performed at near-atmospheric temperature. Accordingly, the produced gas will be reduced in temperature by generating steam which will be admitted along with the steam produced by the fluid bed boiler 8 into the steam turbine of the combined cycle.

The gas producer 2 can be designed and operated at pressures high enough that compression for introduction into the gas turbine would not be necessary. This operating mode would enable all of the equipment to be made more compact, but would introduce problems in coal feeding and ash and char removal which would require development. This alternate choice of operation and design is available without changing the fundamental principles described.

Thus it will be seen that I have provided a highly efficient gas generator and boilers for a coal-fueled, combined cycle, whereby bituminous coal is only partially gasified in a carbonizer and gasifier furnace to produce and refine the fuel necessary for the combustion turbine portion of the cycle,— the remaining ungasified portion of the coal being burnt in the furnace of a separate boiler as a solid fuel, with combustion turbine exhaust gases; furthermore, I have provided a novel apparatus embodying a carbonizer and gasifier furnace provided with a vertically adjustable dam above the grate, whereby the air passing through the grate will fluidize or lift the bed of coal above the grate, limited to a height determined by the dam, and wherein char produced thereby is fed onto the grate of a boiler, where the char is completely burnt as fuel.

While I have described the carbonized coal and gas as useful in a combined cycle power generating plant, they may be used, instead, for any other application desired requiring the burning of gas (purified or unpurified) or low volatile coal, or both.

While I have illustrated and described a single specific embodiment of my invention, it will be understood that this is by way of illustration only and that various changes and modifications may be contemplated within the scope of the following claims.

I claim:

1. In a combined cycle power generating plant, the method of devolatilizing coal by oxidation of a portion of the carbon content thereof in a carbonizing and gasifying reactor having a bed zone with sloping sides and a relatively small grate immediately under the area of widest separation between the sloping sides for admission of air or fluidizing oxidant and an adjustably movable dam in one of said sloping sides; which method comprises feeding, by gravity, crushed bituminous coal into said reactor and onto said grate at superatmospheric pressure, feeding air underneath said grate so as to effect fluidation or lifting of the bed of coal above said grate and floating or decanting char into a char hopper, adjusting said dam so as to control the height to which the fluidized bed will rise while ignited coal in said bed will react with air in partial combustion producing heat from said coal which will volatilize gases from the incoming coal, passing said gases through a boiler which absorbs heat therefrom, and then combusting said gases in a gas turbine, removing char from said reactor into a char hopper without leakage of reactor gases to the atmosphere, whereby a highly expanded and highly agitated fluidized coal bed will be provided which will contact a free furnace space above said bed zone to provide contact time at a controlled temperature for the gases leaving the bed, and discharging said char from said hopper onto a grate of a second boiler for generating steam for a steam turbine, combustion oxidizer for said second boiler being the exhaust gases from said gas turbine, whereby said combustion boiler produces complete combustion of said char and generates steam for said steam turbine.

2. The method recited in claim 1 wherein said volatilized gases are passed through heat recovery apparatus and purified of sulfur and other impurities and used for heating a gas turbine.

3. The method recited in claim 1 wherein said second boiler is a fluid bed boiler and wherein said exhaust gases from said turbine are introduced above and below an ash removal grate of said second boiler.

4. The method recited in claim 3 wherein flue gas from said boilers heats water-conducting coils for generating steam for said turbine.

* * * * *